United States Patent
Christman et al.

(10) Patent No.: US 10,597,020 B2
(45) Date of Patent: Mar. 24, 2020

(54) POWERTRAIN WITH ENGINE START FUNCTION USING RESETTABLE ENGINE SPEED PROFILE

(71) Applicant: GM GLOBAL TECHNOLOGY OPERATIONS LLC, Detroit, MI (US)

(72) Inventors: Anthony L. Christman, Madison Heights, MI (US); Michael D. Potts, South Lyon, MI (US); Paul S. Lombardo, Ferndale, MI (US); Anthony Burt, Ferndale, MI (US); Jeffrey R. Aldrich, Davison Township, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 340 days.

(21) Appl. No.: 15/836,163

(22) Filed: Dec. 8, 2017

(65) Prior Publication Data
US 2019/0176799 A1     Jun. 13, 2019

(51) Int. Cl.
*B60W 30/192* (2012.01)
*F02N 11/08* (2006.01)
(Continued)

(52) U.S. Cl.
CPC ............. *B60W 20/10* (2013.01); *B60L 15/20* (2013.01); *B60W 10/06* (2013.01); *B60W 10/08* (2013.01); *B60W 20/40* (2013.01); *B60W 30/192* (2013.01); *B60L 2240/12* (2013.01); *B60L 2240/423* (2013.01); *B60L 2240/486* (2013.01); *F02N 2200/023* (2013.01); *F02N 2200/045* (2013.01)

(58) Field of Classification Search
CPC ............ B60W 30/192; F02N 2200/023; F02N 2200/045
See application file for complete search history.

(56) References Cited

U.S. PATENT DOCUMENTS 6,291,902 B1   9/2001 Ogane et al.
7,028,657 B2   4/2006 Sah et al.
(Continued)

FOREIGN PATENT DOCUMENTS

CN       104295387 A     1/2015
DE    102014202058 A1    8/2015

*Primary Examiner* — Todd M Melton
(74) *Attorney, Agent, or Firm* — Quinn IP Law

(57) ABSTRACT

A hybrid electric powertrain includes an electric machine delivering torque to an engine in an engine start event having initial cranking and transition phases. In response to a request for an engine start event, a controller commands delivery of the motor torque to the crankshaft. In the initial cranking phase the controller regulates crankshaft acceleration from zero speed up to a target cranking speed in a closed-loop manner via a predetermined fixed profile. In the transition phase, the crankshaft accelerates from the target cranking speed to a target idle speed using a feed-forward torque value blended, using a calibration table, from a predetermined engine drag torque to a reported engine torque. In the transition phase the controller periodically adjusts a speed trajectory of the crankshaft, with the magnitude and frequency of adjustment based on combustion of the engine and calibration of the feed-forward torque.

18 Claims, 4 Drawing Sheets

(51) Int. Cl.
*B60W 20/10* (2016.01)
*B60L 15/20* (2006.01)
*B60W 20/40* (2016.01)
*B60W 10/06* (2006.01)
*B60W 10/08* (2006.01)

(56) References Cited

U.S. PATENT DOCUMENTS

| | | |
|---|---|---|
| 7,237,521 B2 | 7/2007 | Yuya et al. |
| 8,020,652 B2* | 9/2011 | Bryan .................... B60K 6/445 180/65.285 |
| 8,655,526 B2 | 2/2014 | Schwenke et al. |
| 9,631,595 B2* | 4/2017 | Li ........................... F02N 11/08 |
| 9,708,986 B2 | 7/2017 | Yasuda et al. |
| 9,709,014 B2* | 7/2017 | Puri ........................ F02N 11/08 |
| 9,731,710 B2 | 8/2017 | Gibson et al. |
| 9,956,951 B2* | 5/2018 | Kim .................... B60W 30/194 |
| 2007/0087894 A1 | 4/2007 | Tsuneyoshi |
| 2017/0217426 A1 | 8/2017 | Hansen |

* cited by examiner

POWERTRAIN WITH ENGINE START FUNCTION USING RESETTABLE ENGINE SPEED PROFILE

INTRODUCTION

Hybrid electric powertrains typically include an internal combustion engine and one or more electric machines in the form of electric traction motors and/or electric generator units. Engine and motor control processors regulate operation of the engine and electric machine(s), respectively, with a control module used to coordinate the torque contribution from the above-noted torque sources. Hybrid electric powertrains may also be configured to use torque from the electric machine to crank and start the engine. While some powertrain configurations employ an auxiliary starter motor for this purpose, other powertrain configurations, such as those using a belted alternator-starter (BAS) system, rely on torque generated by a high-voltage electric machine. In terms of minimizing noise, vibration, and harshness, it may be advantageous to minimize battery throughput during extreme cold-weather engine start events, particularly when the powertrain uses a battery pack having a reduced power capability.

SUMMARY

A method as set forth herein is intended to improve upon the existing quality of certain engine start events within a hybrid electric powertrain, particularly those occurring in extreme cold temperatures and/or when battery throughput is otherwise constrained due to power limits or other factors. The term "hybrid powertrain" as used herein refers to powertrains having an internal combustion engine and one or more electric machines. The present approach helps engine speed transition from completion of an initial cranking phase, i.e., a period immediately after receipt of an ignition/engine start request during which an engine crankshaft is accelerated from zero speed up to a low threshold rotational speed of about 200-300 revolutions per minute (RPM) sufficient for firing the engine, through a subsequent transition phase in which the crankshaft is accelerated to a higher target idle speed, e.g., 1000-1600 RPM. Engine speed flare may be prevented during and after the above-noted transition phase as a result of the disclosed approach.

The present approach purposefully forgoes the use of closed-loop control of engine speed or acceleration to a fixed profile through the transition phase in favor of periodic adjustments to the engine's speed trajectory using a calibration table, with the calibration table ultimately used to calculate a feed-forward torque used in the control of the engine. The feed-forward torque regulates the rate of rise of the engine speed in a manner that is calibratable to minimize battery throughput, improve noise, vibration, and harshness (NVH), and prevent engine speed overshoot beyond a target idle speed as set forth herein. Required motor torque from the electric machine is thus determined during the transition phase as a function of the feed-forward torque as calculated in the disclosed manner. NVH problems associated with profile-based closed-loop control processes in low temperatures and/or under low power capability conditions are thus largely avoided. In other words, the controller manipulates the feed-forward torque during the transition phase of engine start control in a manner that carefully blends a non-firing engine torque, i.e., accounting for engine friction and pumping losses, to an actual/reported engine torque.

As part of the present method, one or more control modules, hereinafter collectively referred to as a controller for illustrative simplicity without limiting the controller to a single device, periodically adjusts or resets an engine speed trajectory during the transition phase, with the frequency of the periodic resets generally based on factors that are ultimately related to strength of engine combustion. That is, combustion occurring within the individual cylinders of an internal combustion engine tends to be relatively weak in a cold engine when the engine is initially cranked, with combustion strengthening and improving in efficiency as engine speed increases and the engine warms up.

Although not limited to use in low temperatures, the disclosed method may be of particular relative benefit in controlling engine start events in extreme cold weather, e.g., in ambient temperatures well below 0° C. Engine start events conducted under such conditions may see uneven and inefficient combustion at first, particularly when the battery pack and the engine have been off for an extended length of time. In the event of a misfire in a given cylinder due to weak combustion, closed-loop control may still be used to ensure that engine speed does not decrease during the engine start event.

In a non-limiting example embodiment disclosed herein, a hybrid electric powertrain of a vehicle or other system has an engine, an electric machine, and a controller. The engine includes a crankshaft configured to rotate at engine speed. The electric machine selectively delivers motor torque to the crankshaft during a requested engine start event, with the engine start event having the initial cranking and transition phases noted generally above. The controller is configured, in response to an engine start request, to command delivery of motor torque to the crankshaft. In the initial cranking phase, the controller regulates acceleration of the crankshaft from zero speed up to a target cranking speed in a closed-loop manner according to a predetermined fixed profile. In the transition phase, which commences upon detection of firing of the engine, the crankshaft accelerates from the target cranking speed up to a target idle speed in response to the feed-forward torque. The feed-forward torque is blended, using a calibration table, from the predetermined engine drag torque to the reported engine torque (actual torque) over the duration of the transition phase.

The controller may be optionally programmed to evaluate entry conditions, and to automatically default to another fixed engine speed profile when such entry conditions are not satisfied. Such a feature enables selective use of the present method under conditions that would be advantageous in terms of noise, vibration, and harshness. Example entry conditions may include a temperature of the engine and battery pack being less than a corresponding threshold temperature, and/or an ambient temperature being below a threshold ambient temperature for a calibrated duration of time.

The controller may reset an engine acceleration profile to zero upon detection of successful engine firing, with the engine acceleration profile being the above-noted fixed speed profile, effectively enabling onset of feed-forward torque-based control in the transition phase.

Throughout such a duration, the controller may calculate the feed-forward torque by adding a predetermined, non-firing torque/drag torque of the engine, which describes the torque required to spin the engine without combustion, to the product of a gain value from the calibration table, e.g., a value ranging between and inclusive of 0 and 1, and a difference or "torque delta" between an actual/reported engine torque from a torque model and a non-firing torque/ drag torque. In other words, the product of the gain value and torque delta is added to the drag torque to determine the final feed-forward torque. The variable gain value used in this particular embodiment is representative of a difference or "speed delta" between the reported engine speed and the target idle speed, such that the speed trajectory during the transition phase of control is periodically reset by the controller. Thus, as combustion strengthens and crankshaft speed closes on the target idle speed, the frequency of the periodic adjustments or resets is reduced.

The above-noted variable gain may be a number falling within a calibrated range, e.g., 0 to 1, with 0 corresponding to an engine speed at or below the target cranking speed and 1 corresponding to engine speed being equal to the target idle speed. When engine speed is half of the target idle speed in such an example, for instance, a variable gain of 0.5 may be indicated by the calibration table, and so forth. Other calibration tables or ranges thereof could be used, such as power limits, state of charge, and/or other parameters of a battery pack, and thus a linear ramp between 0 and 1 is just one possible approach.

The electric machine may be part of a belted alternator starter system of a hybrid electric vehicle. Motor torque from the electric machine may also be delivered to a transmission so as to propel the hybrid electric vehicle.

A method is also disclosed for starting an engine in a hybrid electric powertrain having the engine, electric machine, and controller noted above. Responsive to receiving a request for an engine start event, the method includes commanding delivery of the motor torque from the electric machine to the crankshaft via the controller. In the initial cranking phase, the method includes regulating acceleration of the crankshaft from zero speed up to a target cranking speed in a closed-loop according to a predetermined fixed profile. In the transition phase, the crankshaft accelerates from the target cranking speed up to a target idle speed using a feed-forward torque. The feed-forward torque is blended, using a calibration table, from a predetermined drag torque of the engine to a reported engine torque over a duration of the transition phase.

The detailed description and the drawings or figures are supportive and descriptive of the disclosure, but the scope of the disclosure is defined solely by the claims. While some of the best modes and other embodiments for carrying out the claimed disclosure have been described in detail, various alternative designs and embodiments exist for practicing the disclosure defined in the appended claims. Furthermore, the embodiments shown in the drawings or the characteristics of various embodiments mentioned in the present description are not necessarily to be understood as embodiments independent of each other. Rather, it is possible that each of the characteristics described in one of the examples of an embodiment can be combined with one or a plurality of other desired characteristics from other embodiments, resulting in other embodiments not described in words or by reference to the drawings. Accordingly, such other embodiments fall within the framework of the scope of the appended claims.

DETAILED DESCRIPTION

Figure 1:
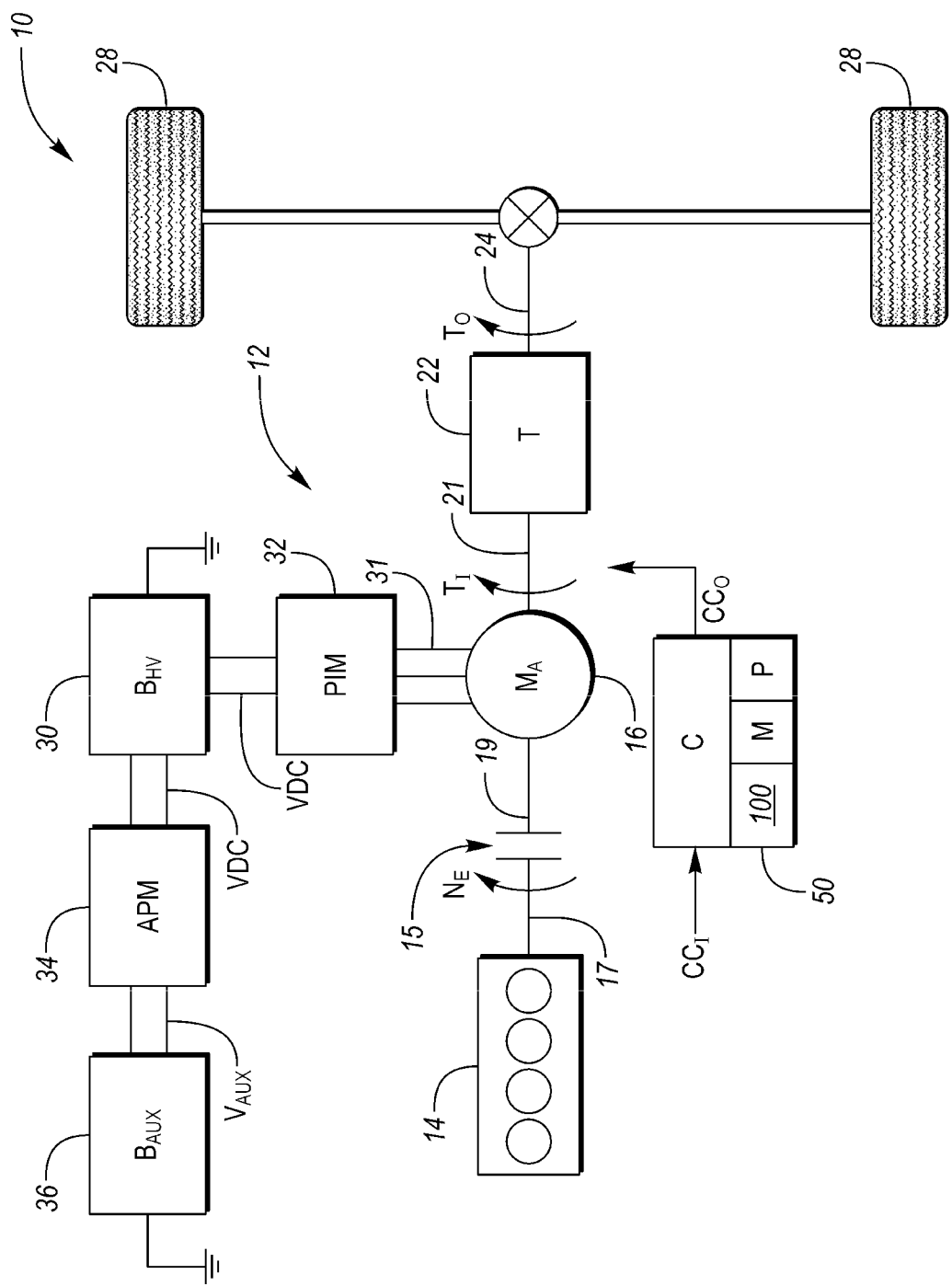
FIG. 1 is a schematic illustration of a hybrid electric powertrain in an example vehicle, with the powertrain having an internal combustion engine, an electric machine, and a controller configured to control an engine start event using the method as set forth herein.

Referring to the Figures, wherein like numerals indicate like or corresponding parts throughout the several views, an example motor vehicle 10 is shown schematically in FIG. 1. The motor vehicle 10 includes a hybrid electric powertrain 12 having an internal combustion engine (E) 14 that is selectively coupled to electric machine ($M_A$) 16, e.g., a polyphase traction motor as shown. The motor vehicle 10 also has a controller (C) 50 programmed to generate a combustion-based, resettable engine speed profile and use such a generated profile to regulate engine speed (arrow $N_E$) during a cranking and starting event of the engine 14 in which the engine 14 is accelerated using torque from the electric machine 16. While the motor vehicle 10 of FIG. 1 is a common type of electromechanical system utilizing the hybrid electric powertrain 12, and is therefore described hereinafter for illustrative consistency, other example systems using the hybrid electric powertrain 12 may include stationary power plants, trains, marine vessels, aircraft, robots, and mobile platforms. The present teachings are therefore not limited to vehicle applications in general or motor vehicle applications in particular.

The engine 14, which may combust gasoline, diesel, biofuel, ethanol, or other fuels without limitation, includes a crankshaft 17 that is selectively coupled to a motor output shaft 19 of the electric machine 16, e.g., via a torque transfer device 15 such as a clutch, a geared connection, or a pulley and belt/chain system, the latter referred to in the art as a belted alternator starter (BAS) system. The electric machine 16 may also be coupled to an input member 21 of a transmission (T) 22, e.g., with internal clutching or motor gear sets (not shown) enabling connection between the engine 14 and the transmission 22, such that input torque (arrow $T_I$) to the transmission 22 may include engine torque from the engine 14 and/or motor torque from the electric machine 16 in different embodiments. Alternatively, the electric machine 16 may be used solely to start the engine 14, in which case the input torque (arrow $T_I$) is effectively the engine torque alone. Regardless of the source or sources of the input torque (arrow $T_I$), the transmission 22 ultimately transfers output torque (arrow $T_O$) to an output member 24 of the transmission 22, and from the output member 24 to a set of drive wheels 28 in order to propel the vehicle 10.

With respect to the electric machine 16, more than one such electric machine 16 may be used as part of the example hybrid electric powertrain 12. For illustrative simplicity, a single electric machine 16 is shown, which in a polyphase embodiment includes phase leads 31, e.g., three phase leads as shown in a typical 3-phase alternating current (AC) configuration, that are electrically connected to a power inverter module (PIM) 32. As is known in the art, a power inverter such as the PIM 32 may be used to invert a direct current (DC) voltage from a DC voltage bus (VDC), with the DC voltage provided by a multi-cell high-voltage battery pack ($B_{HV}$) 30 that is electrically connected to the electric machine 16. As used herein, "high-voltage" refers to a voltage level in excess of typical 12-15 VDC auxiliary voltage levels. When the electric machine 16 is a traction motor configured to propel the vehicle 10, the voltage levels may be relatively high, e.g., 60-360 VDC or more, with such voltage levels being realizable using lithium ion, nickel metal hydride, or other suitable battery chemistries without limitation. When the battery pack 30 is used solely to crank and start the engine 14, required voltage levels may be considerably lower, such as 30-60 VDC in some mild hybrid embodiments.

The battery pack 30 is electrically connected to an auxiliary power module (APM) 34. The APM 34 is also referred to in the art as a DC-DC voltage converter, e.g., a boost converter or a buck-boost converter, and thus the APM 34 is operable for reducing the voltage level on the DC voltage bus (VDC) to auxiliary voltage levels on an auxiliary voltage bus ($V_{AUX}$). An auxiliary battery ($B_{AUX}$) 36 may be electrically connected to the auxiliary voltage bus ($V_{AUX}$) and used to store or supplement power delivered to auxiliary devices or systems on the auxiliary voltage bus ($V_{AUX}$).

The hybrid electric powertrain 12 of FIG. 1 includes a controller 50 that is configured, i.e., programmed in software and equipped in hardware, to execute the method 100 described herein. While described for illustrative simplicity as a unitary control device, the controller 50 may be physically embodied as one or more computer devices each having a processor (P) and memory (M), some of which is computer-readable tangible, non-transitory memory arranged on a printed circuit board or otherwise available to the processor (P). Instructions embodying the method 100 may be programmed into memory (M) and executed as needed via the processor (P) to provide the control functionality over the cranking and starting of the engine 14. Memory (M) may include, by way of example, sufficient read only memory, optical memory, flash or other solid-state memory, and the like. Transitory memory such as random access memory and electrically-erasable programmable read-only memory may also be included, along with other required circuitry (not shown), including but not limited to a high-speed clock, sensing circuitry for detecting currents/voltages/temperatures/speeds/positions of connected devices such as the engine 14 and the electric machine 16, analog-to-digital circuitry, digital-to-analog circuitry, a digital signal processor, and input/output devices and other signal conditioning and/or buffer circuitry.

The controller 50 is also configured to receive input signals (arrow $CC_I$), including an engine start request generated autonomously by the controller 50 or manually-generated by an operator of the vehicle 20, e.g., a key start or push-button start. The controller 50 is further configured to generate control signals (arrow $CC_O$) that ultimately cause a change of operating state of the hybrid electric powertrain 12, such as by controlling the cranking and starting event of the engine 14 in the context of the method 100. In the vehicle 10 illustrated in FIG. 1, for instance, the controller 50 may be embodied as an engine control module or ECM, a motor control processor, and a hybrid control module.

As is known in the art, an ECM typically models, measures, calculates, or otherwise determines and reports certain engine-related values such as engine speed, torque, and temperature. Similarly, a motor control processor governs operation of a given generator or motor, in this instance the electric machine 16, and reports values such as electrical current, voltage, and temperature, all of which may be correlated with motor speed and used in the overall control of the electric machine 16. A hybrid control module may coordinate contributions of various torque sources, here the engine 14 and electric machine 16, to a total required torque of the powertrain 12 to produce an optimal torque distribution for a given operating mode. The reported information of the various control modules is thus available to the controller 50 in executing the present approach.

Figure 2:
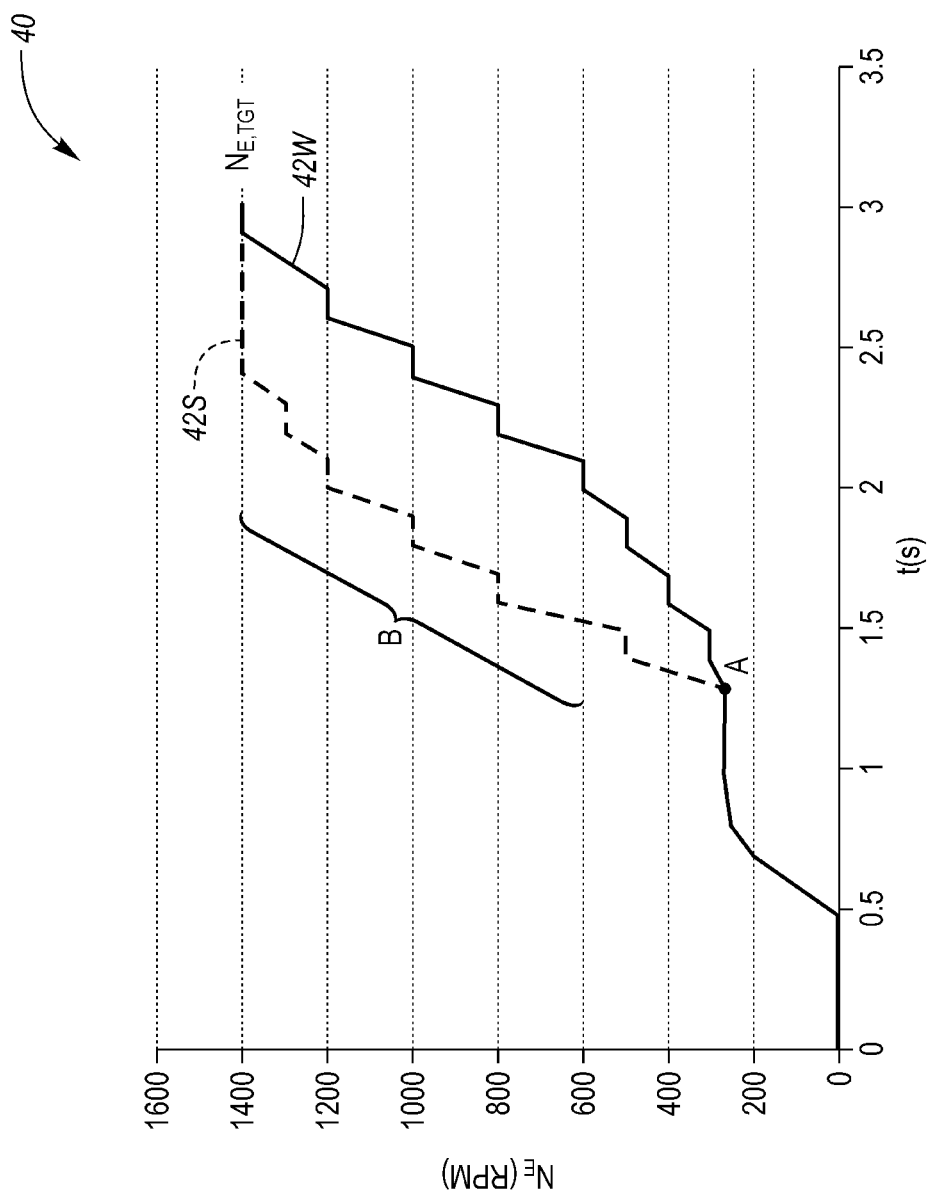
FIG. 2 is a time plot of example comparative engine speed trajectories for strong-firing and weak-firing engine start events, with time depicted on the horizontal axis and engine speed depicted on the vertical axis.

FIG. 2 depicts trajectory traces 40 describing different engine speed trajectories 42S and 42W corresponding to speeds produced by relatively strong and weak firing sequences of the engine 14 of FIG. 1, respectively. The terms "strong" and "weak" as used herein are relative. That is, strong firing or cylinder combustion is indicative of a more efficient combustion process within the cylinders of the engine 14, and thus a more rapid acceleration of the crankshaft 17 relative to a weaker firing sequence. As noted above, factors such as a low temperature of the engine 14 and/or battery pack 30, as well as lower power capability or power limits on the battery pack 30 and the impact of such limits on the electric machine 16, can affect the rate of rise in engine speed. Thus, the example engine speed trajectory 42W, being weaker than trajectory 42S, arrives at the target idle speed ($N_{E,TGT}$) at a later point in time than does the firing trajectory 42S, with the potential for perceptible increases in noise, vibration, and harshness.

The stepped appearance of the two engine speed trajectories 42S and 42W depicted in FIG. 2 illustrate the comparative result of periodic adjustments or resets made by the controller 50 of FIG. 1 as the crankshaft 17 accelerates and engine speed increases upon engine firing at the end of the initial cranking phase, indicated by point A in FIG. 2, until the end of the transition phase (zone B), whereupon the engine 14 arrives within a permitted delta of the target idle speed ($N_{E,TGT}$). When the engine 14 and the battery pack 30 are warmer and sufficient power capability exists in the battery pack 30, a stronger cranking and starting trajectory, e.g., the engine speed trajectory 42S, is more likely to occur. Cold starts, however, tend to produce something akin to the example engine speed trajectory 42W. As a result, the method 100 may be used selectively under cold weather conditions, with the controller 50 optionally reverting to closed-loop control to a fixed torque or speed profile once the engine 14 has been started.

Figure 3:
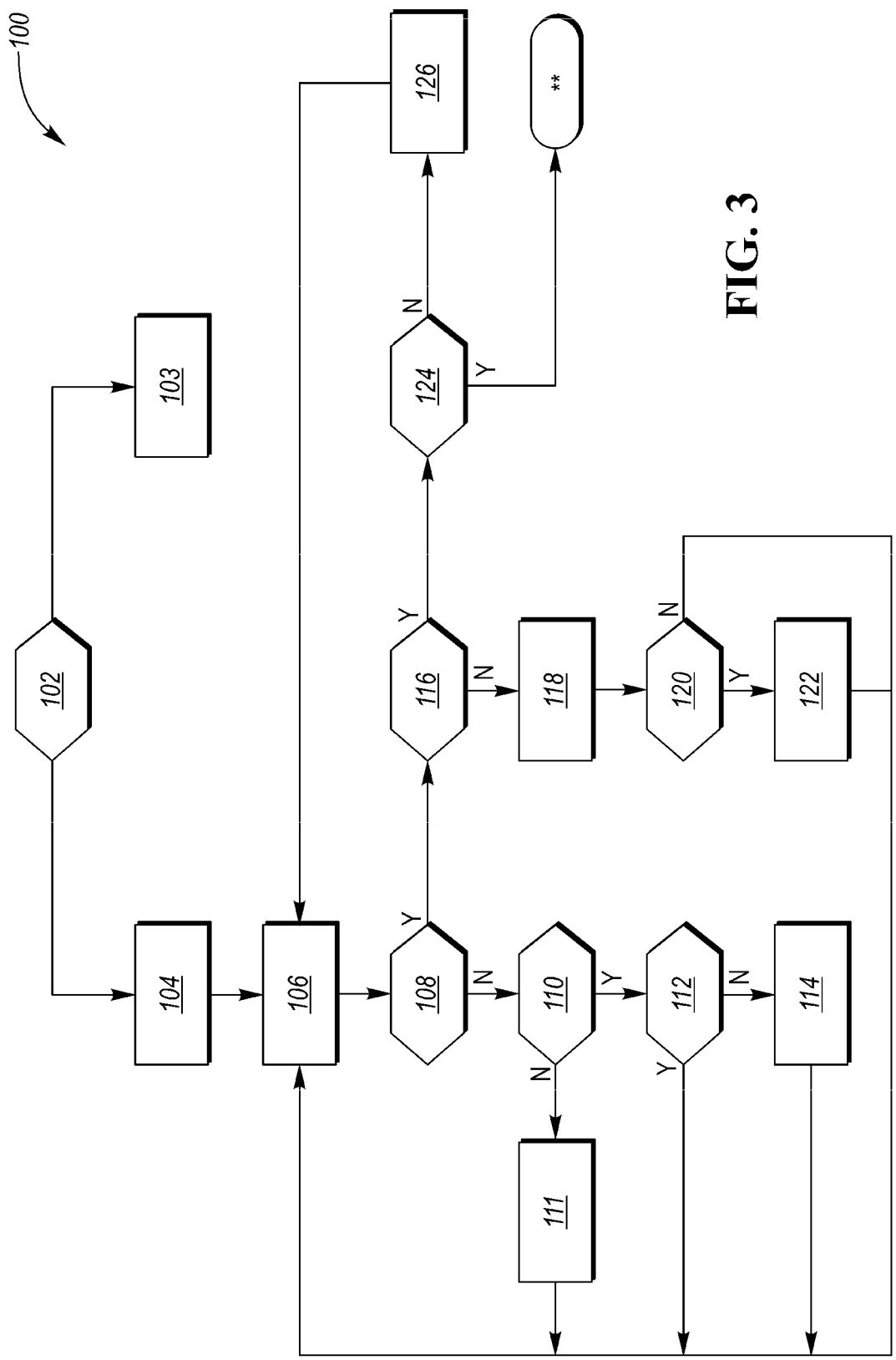
FIG. 3 is a flow chart describing a method for controlling a starting event of an engine within the example hybrid electric powertrain shown in FIG. 1.

An example embodiment of method 100 will now be described with reference to the flowchart shown in FIG. 3. Beginning with step 102, the controller 50 of FIG. 1 may optionally determine if a set of one or more entry conditions is satisfied. As noted above, the method 100 may be particularly useful in extreme low temperature conditions when the engine 14 has been turned off and not fueled for an extended period of time, with the passage of time allowing the engine 14 to cool down from prior use to close to the ambient temperature. Therefore, suitable entry conditions may include a threshold low ambient temperature such as −10° C. coupled with a predetermined "engine off" duration in such a temperature, power limits or power capability of the battery pack 30, and/or a temperature of the engine 14 and/or the battery pack 30 being below a threshold low temperature. The method 100 proceeds to step 103 when such entry conditions are not satisfied, or to step 104 in the alternative when the entry conditions are satisfied.

Step 103 may include executing a default engine start operation. A typical engine start operation conducted with an engine 14 and battery pack 30 that are sufficiently warm or with sufficient power reserves in the battery pack 30 to sustain the cranking and starting process includes commanding the engine 14 to follow a fixed engine speed, torque, and/or acceleration profile controlled in closed-loop control process, e.g., using proportional-integral or proportional-integral-derivative control logic. Such control may be informed by an engine torque and/or speed model stored in memory (M) of the controller 50. The method 100 is complete when the engine 14 has started and the combustion process is self-sustaining.

Step 104 includes setting or selecting an initial target crank speed in logic of the controller 50. Referring briefly to FIG. 2, such a target corresponds to point A. One possible way of implementing step 104 includes extracting a calibrated target cranking speed from memory (M) of the controller 50, e.g., from a lookup table. The target may be a fixed value, or the target may fluctuate based on values similar to those used in step 102, e.g., temperature and power limits. The method 100 then proceeds to step 106.

At step 106 the controller 50 calculates the above-noted feed-forward torque to use to control the engine 14 during the remainder of the transition phase. As noted above, the engine start event is divided into two distinct phases: (i) the initial cranking phase, and (ii) the transition phase. During the initial cranking phase, the rotational speed of the engine 14 is accelerated from zero in a closed-loop manner to the calibrated target cranking speed of step 104 sufficient for firing of the engine 14. In this particular phase, the controller 50 may determine the torque needed from the electric machine 16 as a function of reported engine torque, known/calibrated drag torque of the engine 14, a fixed speed or acceleration profile of the engine 14, i.e., the required rate of change of engine speed ($N_E$), as well as calculated spin losses of the transmission 22. By knowing how much torque the engine 14 is currently producing and how much spin resistance the engine 14 and transmission 22 provide, the controller 50 is able to determine the amount of cranking torque that is needed from the electric machine 16.

Upon detection of successful firing of the engine 14, e.g., by monitoring increases in engine speed, the transition phase of the engine start event commences with the controller 50 determining motor torque as a function of the feed-forward torque and the prior-noted transmission losses. The feed-forward torque is a reported torque value used by the controller 50 as an assumed engine torque. As an illustration, motor torque must be sufficiently high to overcome the feed-forward torque. In other words, at the conclusion of the initial cranking phase, the controller 50 may set the engine acceleration profile used in the initial cranking phase to zero to temporarily disable control to a fixed profile in the transition phase.

Figure 4:
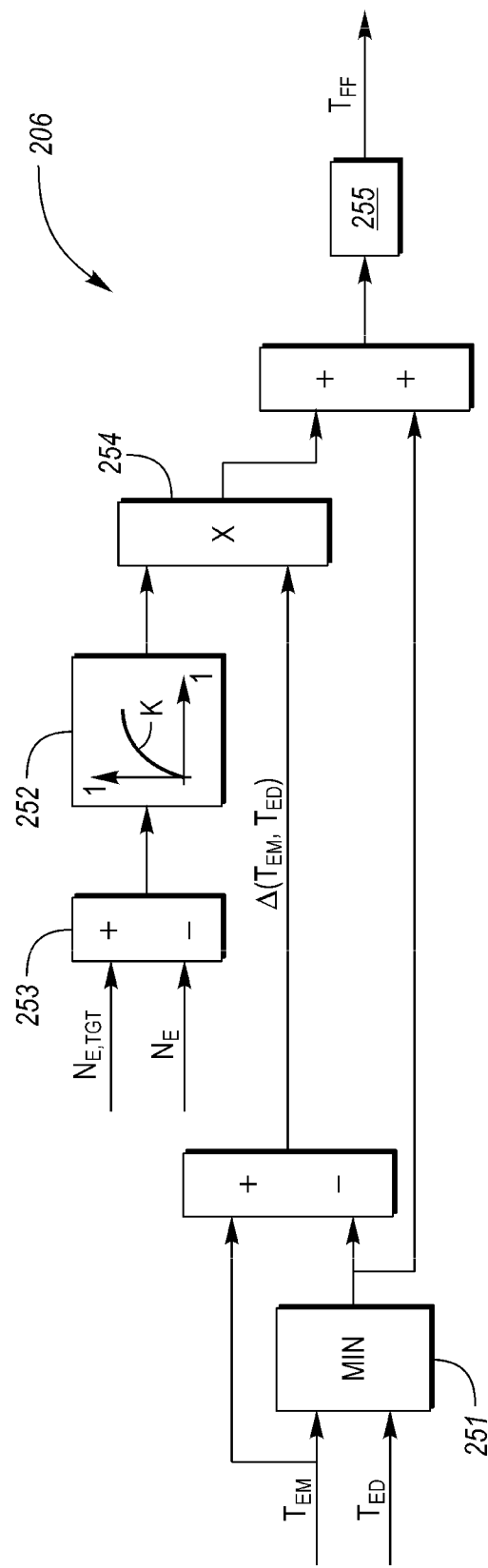
FIG. 4 is a schematic depiction of possible feed-forward torque calculation logic for use by the controller of FIG. 1 in executing the method depicted in FIG. 3.

Step 106 may be implemented by the controller 50 using the example logic shown in FIG. 4. The controller 50 manipulates the feed-forward torque (arrow $T_{FF}$) in step 106 in a manner that gradually blends engine drag torque ($T_{ED}$), i.e., non-firing engine torque, with the actual/reported engine torque as the engine 14 self-lifts, i.e., as engine speed ($N_E$) naturally increases as a consequence of strengthening combustion pulses. This effectively forces the engine 14 to gradually overcome its own drag torque ($T_{ED}$), and prevents aggressive motor torque ramp-outs that could limit the rise in engine speed ($N_E$) if the engine 14 is simply assumed to fire immediately.

As part of the present approach, the engine torque modeled and reported by the controller 50 (ECM), abbreviated $T_{EM}$ in FIG. 4, becomes part of an open-loop control command for the electric machine 16 of FIG. 1. The controller 50 takes the minimum (MIN) of the reported engine torque ($T_{EM}$) and the engine drag torque ($T_{ED}$) at a logic block 251, with reported engine torque ($T_{EM}$) being an instantaneous representation of the torque the engine 14 is actually producing, and with engine drag torque being the calibrated friction and pumping losses of the engine 14, i.e., the steady-state "non-firing" torque required to spin the engine 14. The MIN value during the transition phase is the engine drag torque, and then adds back a portion of the difference between the two values, i.e., a torque delta abbreviated $\Delta(T_{EM}, T_{ED})$. Also calculated at logic block 253 is the difference between reported engine speed ($N_E$) and the target idle speed ($N_{E,TGT}$), with the latter value shown in FIG. 2.

A calibration block 252 then selects a variable gain value (K) from a calibration table recorded in memory (M) of the controller 50, e.g., as a value ranging from 0 to 1 based on the difference determined at block 253. The variable gain value is representative of the difference or speed delta between reported engine speed and the target idle speed ($N_{E,TGT}$). In this embodiment, 0 may correspond to the widest possible difference, i.e., $N_E \leq$=cranking speed, and 1 may correspond to a situation in which engine speed ($N_E$) equals the target idle speed ($N_{E,TGT}$). Thus, the controller 50 effectively adds back more of this difference as engine speed ($N_E$) rises and approaches the target idle speed ($N_{E,TGT}$), such that at multiplier block 254, the difference in engine torque ($T_{EM}$) and engine drag torque ($T_{ED}$), i.e., $\Delta(T_{EM}, T_{ED})$, is multiplied by a gain value ranging from 0 to 1. Other approaches could be used in the calibration table, such as arranging the calibration table based on power limits, state of charge, and/or other parameters of the HV battery pack shown in FIG. 1.

Block 252 may be calibrated in a variety of ways to optimize performance. For instance, one could decide to minimize electric assist and battery throughput (current), or one could transition quickly through resonance by setting the values in block 252 closer to zero. One could also prevent engine flare past the target idle speed ($N_{E,TGT}$) by ramping block 252 up to 1 as engine speed approaches the target idle speed ($N_{E,TGT}$). This portion of the method 100 allows the natural combustion process to gradually lift the speed of the engine 14 from a low initial cranking speed of a few hundred RPM to the higher target idle speed ($N_{E,TGT}$), with the transition phase unfolding without resorting to a predefined fixed speed profile. In other words, the rate of crankshaft 17 acceleration and resultant rise in engine speed is determined in the transition phase by combustion strength of the engine 14. The controller 50 then adds the output of blocks 251 and 254 to produce the feed-forward torque (arrow $T_{FF}$).

Referring again to FIG. 3, the controller 50 determines at step 108 whether the engine 14 has successfully fired, e.g., as indicated by rising engine speed or other suitable factors. The method 100 proceeds to step 110 when engine firing is not detected, and to step S116 in the alternative when engine firing is detected.

At step 110, the controller 50 next compares actual engine speed ($N_E$) to the target cranking speed ($N_{E,TGT}$), i.e., point A of FIG. 2, and determines whether these two values are the same. If so, the method 100 proceeds to step S112. Step S111 is executed in the alternative when engine speed ($N_E$) does not equal the target cranking speed.

Step 111 may include continuing to profile engine speed ($N_E$) to the target cranking speed, i.e., by commanding closed-loop speed control of the engine 14 according to a calibrated fixed engine speed profile. The method 100 then repeats step 106.

Step 112, which is arrived at when the controller 50 determines that the engine 14 has not fired even though the target cranking speed has been reached includes determining if fueling of the engine 14 is properly enabled in logic of the controller 50. The method 100 repeats step 106 when fueling has been enabled, or to step S114 in the alternative when fueling has not been enabled.

At step 114, the controller 50 enables fueling and repeats step 106.

At step 116, the controller 50 determines whether engine speed ($N_E$) is nearing a target ending speed to within a calibrated margin, i.e., a speed of the engine 14 that is marginally higher than the target idle speed ($N_{E,TGT}$). If so, the controller 50 defaults to profiling engine speed ($N_E$) to the target ending speed to provide a desired ramp-out rate of the engine start event, and thereafter proceeds to step S124. Step S118 is executed in the alternative when the target ending speed has not yet been reached.

Step S118 includes setting an engine acceleration profile to zero upon detection if engine firing. Effectively, step 118 latches a desired engine acceleration profile to 0 RPM/s after the initial cranking phase noted above. The method 100 then proceeds to step 120.

Step 120 includes determining if engine speed ($N_E$) exceeds a profile speed plus a delta speed, with the latter being a calibrated value available in memory (M) of the controller 50. Thus, to tune performance of the controller 50 in executing method 100, the value of the delta speed in step S120 may modified. The method 100 proceeds to step 122 when engine speed ($N_E$) exceeds the profile speed plus the delta speed. Otherwise, the method 100 returns to step 106.

Step 122 effectively involves the controller 50 resetting the engine speed profile during the transition phase of the engine start event every time an engine speed pulse is detected, with such a pulse being the value detected at step 120. Therefore, step 112 includes resetting the profile to match the current engine speed, and then returning to step 106.

At step 124, which is arrived at when the engine speed ($N_E$) approaches the target idle speed ($N_{E,TGT}$) as shown in FIG. 2, the controller 50 determines if the target idle speed ($N_{E,TGT}$) has been reached. If not, the method 100 proceeds to step 126. The method 100 is otherwise complete, with the completion status indicated by ** in FIG. 3.

The method 100 as described above allows the controller 50 of FIG. 1, possibly embodied as a separate ECM and hybrid control module and/or multiple other control devices, to periodically reset the speed trajectory of the engine 14 during the transition phase of an engine start event, with the controller 50 resetting the profile to match the actual engine speed as engine combustion strengthens. Using fixed speed or torque profiles and closed-loop control of the engine 14 through both of the initial cranking and transition phases of an engine start event can be difficult to accurately calibrate, and typically offers a distinct tradeoff between noise, vibration, and harshness, as well as battery power throughput. In contrast, the preset approach uses a resettable, combustion strength-based profile during the transition phase, and thus is expected to be more resistant to initial inaccuracies in an engine torque model used by the controller 50 and associated engine torque controllability issues. These and other advantages of the present method 100 will be readily appreciated by those of ordinary skill in the art in view of this disclosure.

While the best modes for carrying out the disclosure have been described in detail, those familiar with the art to which this disclosure relates will recognize various alternative designs and embodiments for practicing the disclosure within the scope of the appended claims. Furthermore, the embodiments shown in the drawings or the characteristics of various embodiments mentioned in the present description are not necessarily to be understood as embodiments independent of each other. Rather, it is possible that each of the characteristics described in one of the examples of an embodiment can be combined with one or a plurality of other desired characteristics from other embodiments, resulting in other embodiments not described in words or by reference to the drawings. Accordingly, such other embodiments fall within the framework of the scope of the appended claims.

What is claimed is:

1. A hybrid electric powertrain comprising:
   an engine having a crankshaft configured to rotate at an engine speed;
   an electric machine configured to deliver motor torque to the crankshaft during an engine start event having an initial cranking phase and a transition phase; and
   a controller configured, in response to a request for an engine start event, to command delivery of the motor torque to the crankshaft, and:
      during the initial cranking phase of the requested engine start event, to regulate acceleration of the crankshaft from zero speed up to a target cranking speed in a closed-loop according to a predetermined fixed profile of the engine; and
      in the transition phase of the requested engine start event, to accelerate the crankshaft from the target cranking speed, after firing of the engine, up to a target idle speed using a feed-forward torque, wherein the feed-forward torque is blended, using a calibration table, from a predetermined drag torque of the engine to a reported engine torque over a duration of the transition phase.

2. The hybrid electric transmission of claim 1, wherein the controller is configured to accelerate the crankshaft during the transition phase by periodically adjusting a speed trajectory of the crankshaft, with a respective magnitude of each periodic adjustment of the speed trajectory being based on a strength of combustion of the engine.

3. The hybrid electric powertrain of claim 1, wherein the controller is configured to periodically adjust the speed trajectory by:
   selecting a variable gain value from the calibration table, with the variable gain value being indicative of a difference between the target cranking speed and an actual speed of the engine;
   multiplying the variable gain value by a torque delta defined as a difference between the reported engine torque and the engine drag torque to generate an adjusted torque; and
   calculating the feed-forward torque by adding the engine drag torque and the adjusted torque.

4. The hybrid electric powertrain of claim 3, wherein the variable gain value ranges from 0 to 1, with 0 corresponding to the actual engine speed being less than or equal to the target cranking speed and 1 corresponding to the actual engine speed being equal to the target idle speed.

5. The hybrid electric powertrain of claim 3, further comprising a battery pack electrically connected to the electric machine, wherein the variable gain value is based on one or more electrical parameters of the battery pack.

6. The hybrid electric powertrain of claim 1, wherein the hybrid electric powertrain includes a battery pack that is electrically connected to the electric machine, and wherein the controller is programmed to default to another predetermined fixed profile when at least one of a temperature of the engine and a temperature of the battery pack are less than a respective threshold temperature.

7. The hybrid electric powertrain of claim 1, wherein the predetermined fixed profile is an engine speed or acceleration profile, and wherein the controller is configured to reset the engine speed or acceleration profile to zero upon detection of the firing of the engine.

8. The hybrid electric powertrain of claim 1, wherein the hybrid electric powertrain is part of a hybrid electric vehicle, and wherein the electric machine is part of a belted alternator starter system of the hybrid electric vehicle.

9. The hybrid electric powertrain of claim 1, wherein the hybrid electric vehicle includes a transmission, and wherein the motor torque from the electric machine is delivered to the transmission to propel the hybrid electric vehicle.

10. A method for starting an engine in a hybrid electric powertrain having the engine, an electric machine configured to deliver motor torque to a crankshaft of the engine, and a controller, the method comprising:
responsive to receiving a request for an engine start event, commanding delivery of the motor torque from the electric machine to the crankshaft via the controller;
in an initial cranking phase of the requested engine start event, regulating acceleration of the crankshaft from zero speed up to a target cranking speed according to a predetermined fixed profile; and
in a transition phase of the requested engine start event, accelerating the crankshaft from the target cranking speed, after firing of the engine, up to a target idle speed using a feed-forward torque, wherein the feed-forward torque is blended, using a calibration table, from a predetermined drag torque of the engine to a reported engine torque over a duration of the transition phase.

11. The method of claim 10, wherein accelerating the crankshaft in the transition phase includes periodically adjusting a speed trajectory of the crankshaft, with a respective magnitude of each periodic adjustment of the speed trajectory being based on combustion of the engine.

12. The method of claim 11, wherein the hybrid electric powertrain includes a battery pack that is electrically connected to the electric machine, and wherein the predetermined entry conditions include a temperature of the engine and/or a temperature of the battery pack being less than a respective threshold temperature.

13. The method of claim 11, wherein the predetermined fixed profile is an engine acceleration profile, the method further comprising: resetting the engine acceleration profile to zero upon the firing of the engine.

14. The method of claim 11, wherein the variable gain value is a numeric value in a range of between 0 and 1, with 0 corresponding to the engine speed being less than or equal to the target cranking speed and 1 corresponding to the engine speed being equal to the target idle speed.

15. The method of claim 11, the method further comprising: controlling the electric machine as part of a belted alternator starter system of a hybrid electric vehicle.

16. The method of claim 11, the method further comprising: delivering the motor torque from the electric machine to a transmission of the powertrain at a level sufficient for propelling the hybrid electric vehicle.

17. The method of claim 10, wherein in the transition phase, accelerating the crankshaft includes periodically adjusting a speed trajectory of the crankshaft by selecting a variable gain value from the calibration table, with the variable gain value being indicative of a difference between the target cranking speed and an actual speed of the engine, multiplying the variable gain value by a torque delta defined as a difference between the reported engine torque and the engine drag torque to generate an adjusted torque, and calculating the feed-forward torque by adding the engine drag torque and the adjusted torque.

18. The method of claim 10, further comprising: defaulting to another fixed engine speed profile when predetermined entry conditions are not satisfied.

\* \* \* \* \*